United States Patent [19]
Frank

[11] Patent Number: 6,116,363
[45] Date of Patent: *Sep. 12, 2000

[54] FUEL CONSUMPTION CONTROL FOR CHARGE DEPLETION HYBRID ELECTRIC VEHICLES

[75] Inventor: Andrew A. Frank, El Macero, Calif.

[73] Assignee: Frank Transportation Technology, LLC, El Macero, Calif.

[*] Notice: This patent is subject to a terminal disclaimer.

[21] Appl. No.: 09/063,995

[22] Filed: Apr. 21, 1998

Related U.S. Application Data

[63] Continuation-in-part of application No. 08/963,037, Nov. 3, 1997, Pat. No. 5,842,534, which is a continuation of application No. 08/455,104, May 31, 1995, abandoned.

[51] Int. Cl.$^7$ ....................................................... B60K 6/04
[52] U.S. Cl. ........................ 180/65.2; 180/65.4; 180/65.8
[58] Field of Search ................................. 180/65.1, 65.2, 180/65.3, 65.4, 65.8; 318/587; 701/22, 36

[56] References Cited

U.S. PATENT DOCUMENTS

| | | |
|---|---|---|
| 4,042,056 | 8/1977 | Horwinski . |
| 4,180,138 | 12/1979 | Shea . |
| 4,269,280 | 5/1981 | Rosen . |
| 4,335,429 | 6/1982 | Kawakatsu . |
| 4,400,997 | 8/1983 | Fiala . |
| 4,533,011 | 8/1985 | Heidemeyer et al. . |
| 4,697,660 | 10/1987 | Wu et al. . |
| 5,115,183 | 5/1992 | Kyoukane et al. . |
| 5,117,931 | 6/1992 | Nishida . |
| 5,343,970 | 9/1994 | Severinsky . |
| 5,923,025 | 7/1999 | Ellers . |

FOREIGN PATENT DOCUMENTS

| | | |
|---|---|---|
| 2310238 | 1/1977 | France . |
| 2494642 | 5/1982 | France . |
| 4206360 | 9/1993 | Germany . |

OTHER PUBLICATIONS

Wood's Gas–Electric Car, Instruction No. 80, Dyke's Encyclopedia, 1935.

Frank et al., "Computer Simulation of the University of Wisc. Hybrid–Electric Vehicle Concept", May 1973.

*Primary Examiner*—Michael Mar
*Attorney, Agent, or Firm*—John P. O'Banion

[57] ABSTRACT

A charge depletion method and apparatus for operating the electric motor and auxiliary power unit, such as an internal combustion engine, in a hybrid electric vehicle (HEV) separately or together depending upon the driving conditions. Operation of the electric motor and auxiliary power unit are coordinated as a function of a control policy for the auxiliary power unit based on desired least fuel consumption and/or vehicle emissions characteristics.

6 Claims, 7 Drawing Sheets

ACCELERATOR PEDAL

FIG. – 12

BRAKE PEDAL

FUEL CONSUMPTION CONTROL FOR CHARGE DEPLETION HYBRID ELECTRIC VEHICLES

CROSS-REFERENCE TO RELATED APPLICATIONS

This application is a continuation-in-part of application Ser. No. 08/963,037 filed on Nov. 3, 1997, now Pat. No. 5,842,534 which is a continuation of Ser. No. 08/455,104 filed on May 31, 1995, now abandoned.

BACKGROUND OF THE INVENTION

1. Field of the Invention

This invention pertains generally to hybrid powered vehicles employing both electric motors and auxiliary power units, and more particularly to controlling fuel consumption in a charge depletion hybrid electric vehicle.

2. Description of the Background Art

As discussed in my copending U.S. application Ser. No. 08/963,067, a hybrid electric vehicle (HEV) is a vehicle with electricity as the primary energy source and an auxiliary power unit (APU) as the secondary source. The APU is typically an internal combustion engine (ICE) utilizing reformulated gasoline, methanol, ethanol, diesel, compressed natural gas or other hydrocarbon as a fuel source. The electrical energy is stored in chemical storage batteries or capacitors. A series hybrid electric vehicle uses the ICE to drive a generator which supplies power to the electric motor (EM) or charges the batteries, whereas a parallel hybrid uses the ICE and EM together to directly drive the wheels. In both configurations, the ICE is used to supplement the energy capacity and power capability of the battery pack.

Most parallel hybrid vehicles are configured with a large ICE. The EM is selected for urban driving and acceleration, since the ICE may not be used provide the power required for this driving demand. In emergency situations, the ICE can provide "limp-home" capability when the batteries reach a depth of discharge (DOD) where the EM can no longer accelerate the vehicle.

Various control strategies have been previously developed for operating the EM and ICE in hybrid vehicles. None of the existing control schemes, however, integrate the operation of the EM and ICE in a hybrid vehicle in a way which maximizes both efficiency and range on the batteries while maintaining performance of the vehicle; that is, using a "charge depletion" control method in accordance with the present invention. Conventional control schemes operate on the principle of sustaining the charge on the batteries, rather than depleting the batteries as in the present invention. The present invention satisfies the need for a control method and apparatus that will provide for integration of the EM and ICE in an efficient manner without sacrificing vehicle performance.

Furthermore, government regulating agencies such as the Environmental Protection Agency (EPA) and the California Air Resources Board (CARB), as well as users of a "charge depletion hybrid electric vehicle" (CDHEV) in accordance with the present invention, may want to change the relative amounts of liquid or hydrocarbon fuel and electric energy used by a fleet of CDHEVs, since the cost and technology of each commodity may change over time. For example, electric energy is currently less expensive for powering a vehicle per mile than gasoline. On the other hand, emissions from electrical powerplants may be less clean and less environmentally friendly than from gasoline engines. The present invention further satisfies the need to provide for changing the manner in which operation of the EM and ICE are controlled so as to allow for adjustment of the relative amounts of combustible fuels and electric energy consumed during operation of the vehicle fleet.

The EPA currently specifies to vehicle manufacturers what is referred to as a "corporate average fuel economy" (CAFE) as well as individual vehicle emissions. A CDHEV in accordance with the present invention permits the EPA to also specify and regulate both emissions and fuel consumption for a fleet of hybrid electric vehicles. On the other hand, local regulations may be different since air quality and performance requirements change depending upon traffic and road infrastructure.

BRIEF SUMMARY OF THE INVENTION

The present invention generally comprises a "charge depletion" method and apparatus for operating the electric motor (EM) and internal combustion engine (ICE) in a hybrid electric vehicle (HEV) separately or together depending upon the driving conditions. The invention further comprises a charge depletion control policy (CDCP) that can be modified to adjust the relative amounts of combustible and electric fuels used for operation of the vehicle.

By way of example, and not of limitation, the invention provides for operating the hybrid powertrain in a zero emissions vehicle (ZEV) mode and in an HEV mode. In the ZEV mode, the EM provides all driving power while the ICE is uncoupled and turned off. In the HEV mode, operation of the EM and ICE is coordinated for maximum range and fuel efficiency.

The ICE used in a vehicle employing the present invention can be typically very small (e.g., approximately 0.016 kW/vehicle kg) and typically would be sized to power the vehicle at its best efficiency for legal freeway cruise speeds. The engine can be used to cruise the vehicle at a level above the maximum speed limit for a range of approximately 690 km or more. However, in typical city driving conditions, driving with the ICE alone produces less-than-desirable performance because of its small size. This is an important aspect of the invention since it encourages the driver to remember to periodically charge the vehicle batteries at home. Additionally, the varying driving conditions inherent in city driving will cycle the engine and reduce efficiency. Emissions would increase and fuel efficiency would decrease.

In accordance with one CDCP of the present invention, as long as the battery depth of discharge (DOD) is less than a hybrid integration cross-over point of approximately 50% (i.e., the DOD is between 0% and approximately 50%), and the vehicle speed is less than approximately 113 kph, then the EM is operated alone; that is, the ICE is uncoupled and turned off. Here, the vehicle operates in a ZEV mode. At speeds greater than approximately 113 kph, the vehicle operates in an HEV mode where the ICE is used as the primary source of power and the EM is automatically activated to (i) assist the ICE during acceleration (e.g., for passing or climbing hills) or (ii) regenerate energy back into the battery during braking. Once the depth of discharge exceeds the hybrid integration cross-over point, the ICE is brought on line and turned on at varying vehicle speeds below approximately 113 kph. As the depth of discharge increases, the vehicle speed at which the ICE is brought on line decreases in order to increase overall range.

In other words, as long as the battery depth of discharge is less than approximately 50% and the vehicle speed is less than approximately 113 kph, then the EM is operated alone; that is, the ICE is uncoupled and turned off. Therefore, the vehicle operates in a ZEV mode. At speeds greater than approximately 113 kph, the vehicle operates in an HEV mode where the ICE is used as the primary source of power and the EM is automatically activated to (i) assist the ICE during acceleration (e.g., for passing or climbing hills) or (ii) regenerate energy back into the battery during braking. Once the depth of discharge exceeds the cross-over point, the ICE is brought on line and turned on at varying vehicle speeds below approximately 113 kph.

As a result, the invention combines the advantages of a ZEV vehicle in most city driving conditions as well as extended city range and high freeway efficiencies from the ICE. Typically, the vehicle can be driven in all driving conditions with full performance until the batteries reach a state of approximately 85% depth of discharge or more. The vehicle then degrades in acceleration performance can continue to operate. The usable battery charge corresponds to a city driving range of approximately 160 km. Based on recent studies of vehicle usage, a range of approximately 115 km will satisfy over 80% of the typical road vehicle miles traveled by the public daily. Therefore, the vehicle power train will function as a ZEV for a majority of drivers in the city. Further, the vehicle will satisfy the needs of over 99% of the drivers when employing this CDCP. The vehicle will satisfy 100% of the drivers in reaching their destination; only 1% or less may reach their destination with degraded performance because they drove too far and the batteries are spent.

It will be appreciated that, by altering the CDCP, the overall amount of combustible fuel burned by the vehicle in comparison to the amount of electric energy used can be increased or reduced to meet governmental or user mandated standards. If the DOD parameter in the CDCP is decreased, the amount of combustible fuel burned will increase, whereas increasing the DOD parameter in the CDCP will decrease the amount of combustible fuel burned and the vehicle will be powered by the EM more often thereby decreasing the high performance range.

For example, assume that typical commuters travel approximately 40 miles and that a fleet of conventional vehicles driven by such computers uses approximately 2500 gallons of gasoline per 1000 vehicles. The CDCP described above with a crossover point of approximately 50% DOD would reduce fleet consumption of gasoline to approximately 70 gallons per 1000 vehicles for an approximate gasoline savings of 97%. By lowering the hybrid integration crossover point from 50% to 20%, only a 95% gasoline savings would be realized. If the hybrid integration crossover point is further reduced, and the speed cross-over point is lowered from 113 km/hr to approximately 65 km/hr, the gasoline savings would be reduced to 85, and by further lowering the speed cross-over point to approximately 20 km/br, only a 60% gasoline savings would be realized.

Therefore, the threshold speeds and adjustment of the threshold speeds, as well as the charge depletion of the batteries (DOD characteristics), are a function of a control policy for the auxiliary power unit based on desired fleet fuel consumption and/or fleet vehicle emissions characteristics.

In accordance with another aspect of the invention, control of vehicle acceleration and speed is preferably accomplished using a two-stage accelerator pedal when in hybrid mode where both the engine and the electric motor are powering the vehicle. Approximately the first $\frac{1}{3}$ of pedal travel controls the throttle position of the ICE and the last $\frac{2}{3}$ controls the torque of the EM. When operating in the HEV mode the ICE operates at high throttle settings and, when the ICE is operating at wide open throttle (WOT) but additional power is still required, the driver depresses the pedal further and the EM torque is automatically added. Therefore, vehicle acceleration is proportional to the accelerator pedal position as in a conventional car. Transmission shifting is accomplished similar to conventional cars.

Since vehicle "launch" is performed by the EM, an automatic transmission would not need a torque converter. Further, a computer is not needed to coordinate the ICE throttle and EM torque control. Operation of the brake pedal is similar to the accelerator pedal, where the first part of the pedal depression provides regenerative braking by the EM, and the continued deflection eventually activates mechanical brakes which simply adds to the braking effort already available from regeneration.

In accordance with another aspect of the invention, the batteries are not charged directly by the ICE during operation of the vehicle, except during emergency conditions, in which case charging would only be partial and solely to maintain performance. For example, if the batteries were completely depleted (e.g., 100% DOD or 0% state of charge) and the ICE was running, the batteries could be slightly charged by the ICE (e.g., 5% state of charge) only to provide additional performance to get home or to a charging station. The manner of doing so would be for the driver to pull off to the side of the road, place the transmission in neutral, and depress both the accelerator pedal and the brake pedal at the same time so as to allow the ICE to operate at high rpm for several minutes. In such an event, the ICE and EM would both be on line, and the ICE would drive the EM in a regenerative mode so as to recharge the batteries. In normal operation, however, the batteries are charged only from an external power source. Thus, the hybrid control method of the present invention will be referred to herein as a "charge depletion" hybrid, in contrast to conventional "charge sustaining" hybrids which charge the batteries directly from the ICE. In this context, note that long range batteries are required to make the vehicle practical. No controls are available to the driver of the vehicle other than an accelerator pedal, brake pedal and, if desired, a transmission clutch pedal. Operation in the ZEV and HEV modes are automatic, and the driver does not have control over those modes of operation.

An object of the invention is to provide a control system for a hybrid electric vehicle powertrain which can provide super fuel and energy efficiency.

Another object of the invention is to provide a control system for a hybrid electric vehicle powertrain which can provide for ultra low tailpipe emissions in a fleet.

Another object of the invention is to provide a control system for a hybrid electric vehicle powertrain which can provide for high performance.

Another object of the invention is to provide a control system for a hybrid electric vehicle powertrain which can provide for low cost manufacturing due to simplicity.

Another object of the invention is to provide a control system for a hybrid electric vehicle powertrain which is simple to operate.

Another object of the invention is to provide a control system for a hybrid electric vehicle powertrain which is automatic.

Another object of the invention is to provide for flexibility in the control policy of a charge depletion hybrid electric vehicle.

Another object of the invention is to provide control over the relative amounts of combustible fuel and electric energy used in a charge depletion hybrid electric vehicle.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, where like reference numerals denote like parts, for illustrative purposes the present invention is embodied in the apparatus and method generally depicted therein. It will be appreciated that the apparatus may vary as to configuration and as to details of the parts, and that the method of the invention may vary as to the steps and their sequence, without departing from the basic concepts as disclosed herein.

Figure 1:
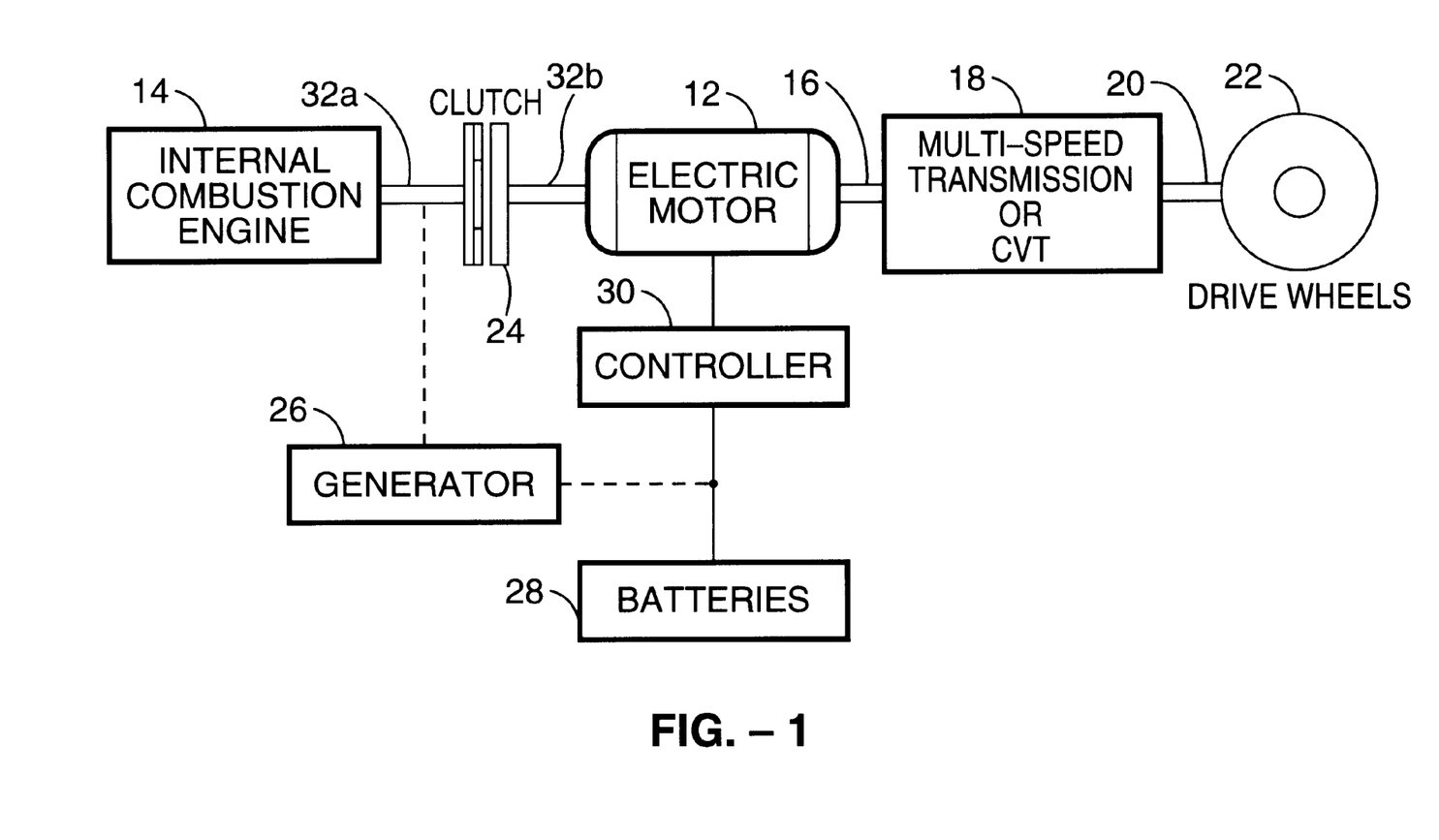
FIG. 1 schematically depicts a hybrid vehicle powertrain in accordance with the present invention showing the preferred embodiment with a clutch for a "parallel" configuration, and showing a generator which can replace the clutch and shaft for a "series" configuration.
Figure 2:
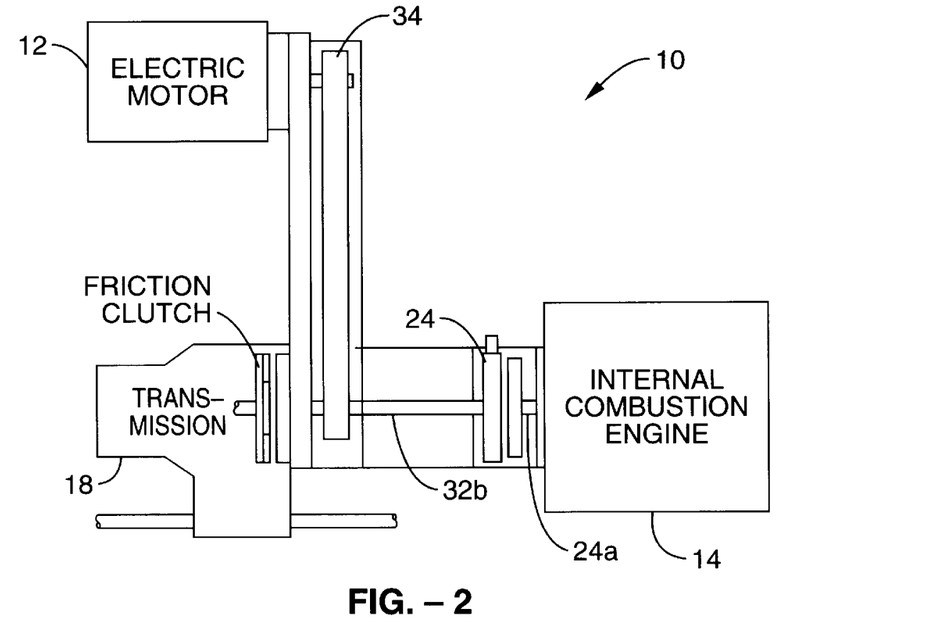
FIG. 2 is a schematic diagram of an embodiment of a parallel hybrid vehicle powertrain in accordance with the present invention.

In accordance with the present invention, a hybrid electric vehicle can enjoy the advantages of electric vehicles (e.g., zero emissions, no idling, efficient energy usage) and conventional gasoline vehicles (long range, widely available fuel). Referring first to FIG. 1 and FIG. 2, a hybrid powertrain configuration 10 in accordance with the present invention utilizes a large electric motor (EM) 12 and an auxiliary power unit (APU) 14 which is preferably a small internal combustion engine (ICE) integrated in a drive package. Alternatively, APU 14 may be an external combustion engine, such as a Sterling or steam engine, or a fuel cell which would be electrically connected to the batteries and throttle control. The EM 12, which typically has a power output of approximately four times that of ICE 14, may be any high power electric motor operating from batteries, such as a Unique Mobility SR180N brushless, permanent-magnet DC motor or the like with regenerative braking. The ICE 14 may be any small gasoline engine such as a Briggs & Stratton Vanguard or the like. The EM 12 is typically coupled to a shaft 16 which transmits power to a multi-speed or continuously variable transmission 18 which in turn drives a shaft 20 which transmits power to the wheels 22. The transmission 18 may be manual or automatic and, if automatic, would not require a torque converter. Continuously variable transmissions may be employed as well. A conventional cable actuated shifting system (not shown) retrofitted to the transmission 18 produces a standard shift pattern if the transmission is manually controlled.

Note that powertrain 10 shown in FIG. 2 is depicted in a generic form in FIG. 1, applicable to both series and parallel hybrids. In a parallel hybrid configuration, ICE 14 would be coupled to EM 12 via an electromagnetic clutch 24 or the like. In a series hybrid configuration, ICE 14 would not be coupled to EM 12 but, instead, would drive a generator 26 which would in turn provide electric power to drive EM 12 but would not charge batteries 28 when using a charge depletion control scheme. In either configuration, a controller 30 is used to control the speed and torque of the EM 12.

In the parallel hybrid configuration, the electromagnetic clutch 24 is typically a Warner SF825 or the like coupled to intermediate shafts 32a, 32b, and is used to engage and disengage the ICE 14 from the drivetrain. If specially designed, EM 12 could run at the same speed as the ICE 14 and thus could be in line with the transmission 18 and the ICE 14 as shown in FIG. 1. Alternatively, a belt 34, such as a 36-mm Kevlar Gates Poly Chain GT belt or the like can be used to connect the EM 12 to the intermediate shaft 32b in a configuration as shown in FIG. 2. By using a reduction ratio of 1.56:1 or the like, the rpm range of the EM 12 is matched to that of the ICE 14. Either way, the EM 12 is always coupled to the drivetrain. This allows the regenerative braking capability of the EM 12 to be available on all modes, so as to load the drivetrain and produce electricity when desired. The regenerative braking capability of EM 12 is activated when the brake pedal is slightly depressed.

As indicated above, the EM 12 can be a Unique Mobility SR180N electric motor or the like, which is a permanent-magnet, brushless direct current electric motor. An AC induction motor or similar traction motor may also be used.

The charge-depletion parallel hybrid design requires that the ICE 14 be sized to maintain the vehicle load requirements at level road legal highway cruising speeds (95–120 km/hr in the U.S. or other legal speeds in various countries) as well as to provide the best fuel economy at these cruising speeds. Additionally, the ICE 14 must have low specific fuel consumption (high efficiency) and emissions for all power levels. These requirements mandate careful selection of the ICE 14. An internal combustion engine can be made to operate most efficiently at wide open throttle; therefore, the power output of the ICE 14 must match the power required to maintain the vehicle at a desired highway cruising speed.

The ICE 14 was sized to power the vehicle for freeway cruise at 113 kph for in a specific example constructed. In typical city driving conditions, however, driving with the ICE 14 alone produces low performance. Additionally, the varying driving conditions inherent in city driving will cycle the engine and reduce efficiency. Emissions would increase and fuel efficiency would decrease.

In order to improve performance in these conditions, the charge depletion control method of the present invention was developed by monitoring vehicle speed and depth of discharge (DOD) of the battery, and controlling the EM 12 and ICE 14 as a function thereof. The invention provides for operating the hybrid powertrain in a zero emissions vehicle (ZEV) mode and in a hybrid electric vehicle (HEV) mode. In the ZEV mode, the electric motor provides all driving power while the internal combustion engine is uncoupled and turned off. Typically, the vehicle can be driven in all driving conditions until the batteries reach a state of approximately 90% DOD. The usable battery charge corresponds to a ZEV range of approximately 120–160 km.

Figure 3:
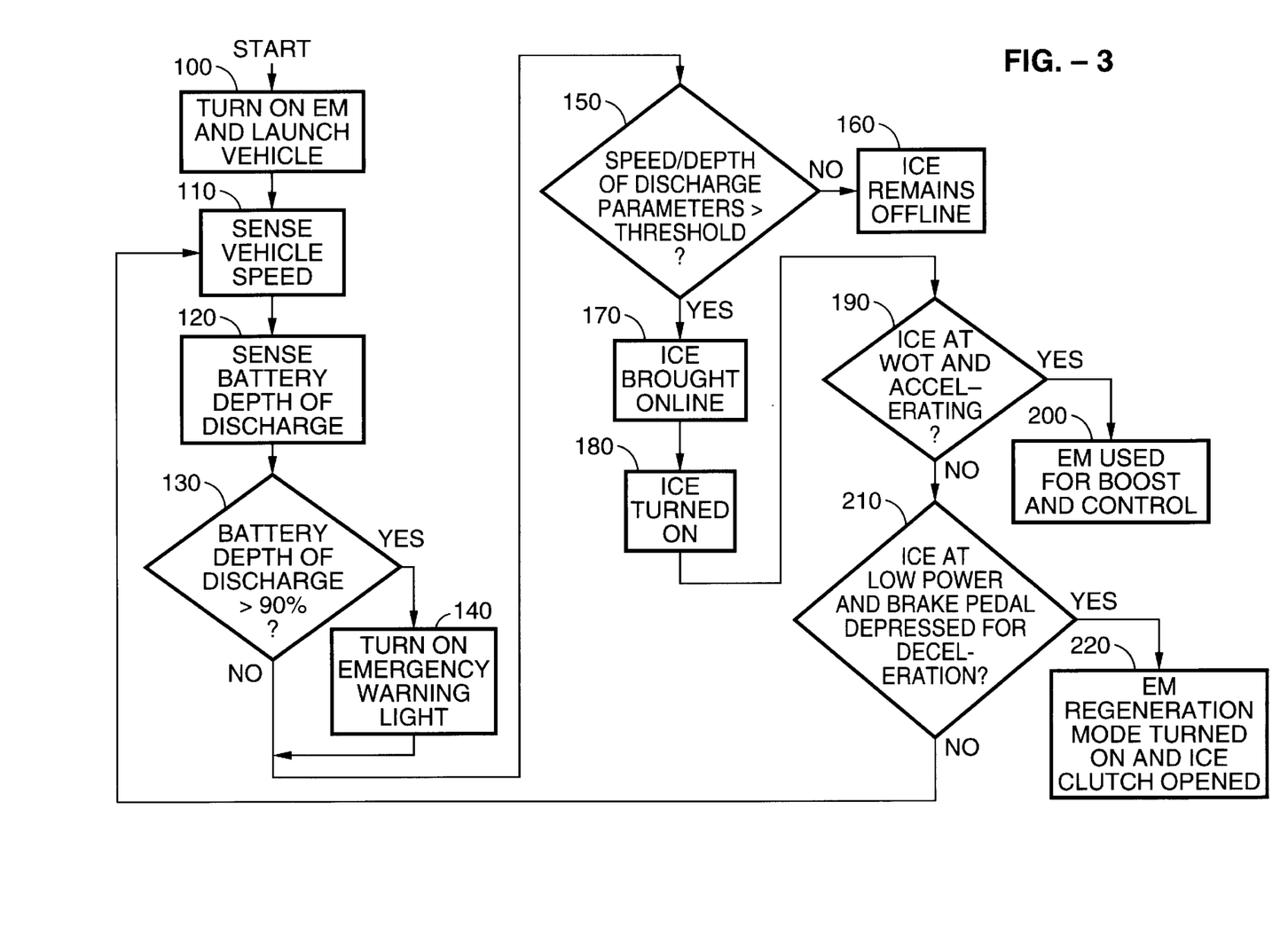
FIG. 3 is a flow chart showing an embodiment of the method of the present invention.

Referring to FIG. 3, a general flow diagram of the control method is shown. At step 100, the EM 12 is turned on to "launch" or start the vehicle and the vehicle operates in a ZEV mode. At steps 110 and 120, the vehicle speed and battery depth of discharged are sensed, respectively. At step 130 a determination is made as to whether there is less than a low predetermined value, such as approximately 10%, charge left. If the depth of discharge is greater than the predetermine value, such as 90%, then an emergency warning light is activated at step 140 so that the driver can take appropriate emergency measures to recharge the batteries or continue to operate the vehicle at degraded performance. For example, the driver can stop the vehicle, put the transmission in neutral, push the accelerator and brake pedals simultaneously, and run the ICE 14 at high rpm for several minutes. This will partially charge the batteries and allow the vehicle to "limp" home for a complete recharging. Of course, the driver can simply continue home with lower acceleration capability if desired.

At step 150 the vehicle speed and battery depth of discharge are compared with a control curve and, if those parameters exceed a predetermined threshold, the ICE 14 is brought on line by engaging the clutch at step 170 and turning the engine on at step. 180. Otherwise, the ICE 14 remains off line and the vehicle continues to operate in a ZEV mode at step 160. Once the ICE 14 is operating, the EM 12 is available for supplemental use. If ICE 14 is operating at wide open throttle and a call for acceleration or other additional power demand is sensed at step 190, then at step 200 EM 12 is used to supply additional power such as for boost and control of the vehicle; for example, when the vehicle is accelerating or climbing a hill. If ICE 14 is operating at low power and the brake pedal is depressed for deceleration at step 210, then at step 220 the EM 12 is operated in a regeneration mode and the ICE clutch is opened. In this mode, the EM 12 loads the vehicle powertrain to assist in slowing the vehicle, and generates electricity which will provide a charge to the batteries. If desired, during deceleration or braking the ICE 14 could be taken off line and turned off by decoupling the clutch and cutting of the flow of fuel. As can be seen, the process otherwise returns to step 110 from step 210.

Figure 4:
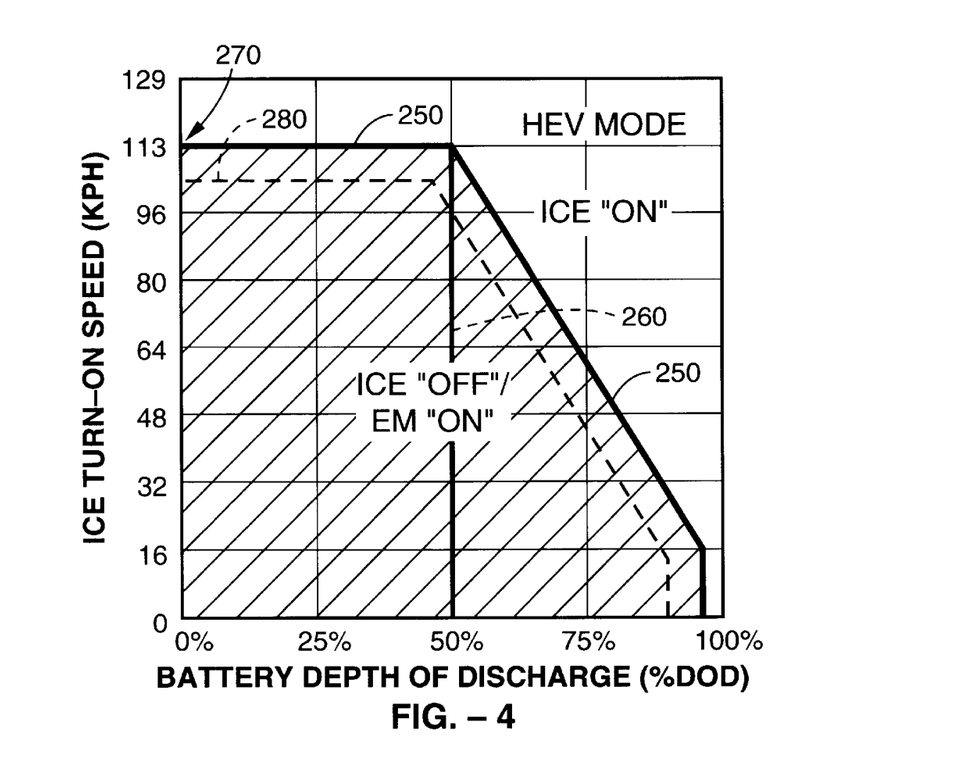
FIG. 4 graphically depicts a control policy for the operation of a hybrid vehicle electric motor and internal combustion engine as function of vehicle speed and battery depth of discharge in accordance with the present invention.

Referring also to FIG. 4, a preferred control policy used for coordinating the operation of the EM 12 and the ICE 14 in step 150 of FIG. 3 are graphically shown. The area below the "on" threshold curve 250 is where the vehicle operates in a ZEV mode, with the EM 12 turned on and the ICE 14 decoupled and turned off. The area above the "on" threshold curve 250 is where the vehicle operates in a HEV mode with the ICE 14 coupled and turned on, and with the EM 12 being used only for accelerating, climbing hills and regenerative braking.

In accordance with the control policy shown in FIG. 4, as long as the battery DOD is less than the hybrid integration cross-over point 260 of approximately 50% and the vehicle speed is less than the maximum speed threshold 270 of approximately 113 kph to 120 kph, then the EM 12 is operated alone. This is the range of speeds typically encountered in city driving.

Therefore, the vehicle operates as a ZEV. When the vehicle is operating at speeds in excess of approximately 113 kph to 120 kph, which corresponds to freeway driving, the ICE 14 is turned on and the EM 12 is used only for accelerating, climbing hills, and regenerative braking. However, once the DOD exceeds approximately 50%, the ICE 14 is brought online at varying speeds as a function of DOD; that is, as the DOD increases, the speed at which the ICE 14 is brought online decreases in order to increase overall range. Therefore, the ICE 14 is not turned on unless the vehicle speed exceeds approximately 113 kph or unless the batteries are approximately 50% depleted. Then it is brought on according to the batteries' DOD. After the ICE 14 is turned on and vehicle is operating in a HEV mode, if the vehicle speed/depth of discharge parameters fall below the "off" threshold curve 280, the ICE 14 is decoupled and turned off. Then, since the EM 12 is still online, the vehicle again operates in a ZEV mode. The control band between the "on" threshold curve 250 and the "off" threshold curve 280 prevents undesirable or excessive cycling of the ICE 14 due to fluctuations in sensed speed and depth of discharge. As an alternative to separate "on" and "off" thresholds, a single threshold could be used in combination with a time delay between the "on" and "off" modes to prevent frequent cycling. Both techniques may also be used.

In a typical vehicle employing the present invention, the 50% depletion point of the batteries should occur at approximately 115 km of city driving. If a driver is on a freeway and exceeds 113 kph but stays below a specific design speed such as 120 kph (which is a speed where the ICE 14 alone will be insufficient to power the vehicle), the driver uses no battery electrical energy except when needed to pass someone or to climb a hill or mountain (a very small amount is used constantly since the EM 12 is always online). With the amount of energy storage in such a vehicle, a 3300 meter high mountain can be climbed at 115 kph using a properly designed small gasoline engine with altitude compensation and a large electric motor on highways constructed to current US standards. There should be energy left in the battery after such a climb to continue for some distance. When the vehicle is stopped for the driver or passengers to have lunch, it can be recharged, to top off the batteries if necessary or desired. This capability makes the configuration and control system of this invention generally applicable to the public and provides the vehicle a capability comparable to a conventional car. The difference, of course, is super fuel efficiency (e.g., 2.3 to 2.5 liters per 100 km) and Ultra Low Emission Vehicle (ULEV) capability. The fuel efficiency will be two to three times the economy of a conventional vehicle, while the performance will be equal or better.

As indicated above, when driving in the city beyond approximately 50% percent DOD of the battery, the gasoline engine will come "on" at a lower speed depending on the DOD. This will extend the electric range for city driving to approximately 350 to 375 km. In order to drive this distance in the city, a driver would spend nine to ten hours behind the wheel. Less than 0.1 percent of the population would drive this far in the city in one day. This range is purposely set to be greater than the human limit for 99.9% of the population.

Figure 5:
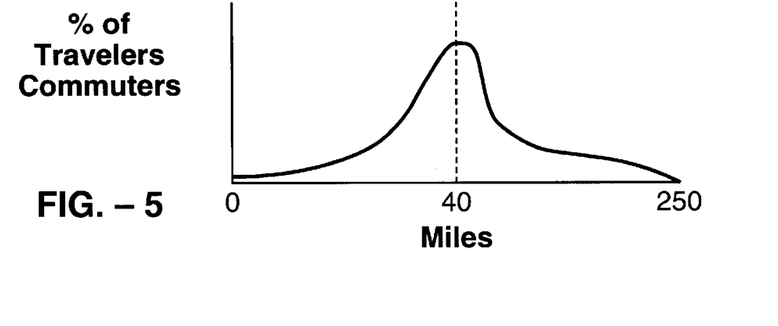
FIG. 5 is a graph depicting the distribution density of travelers using vehicles in a geographical area.
Figure 6:
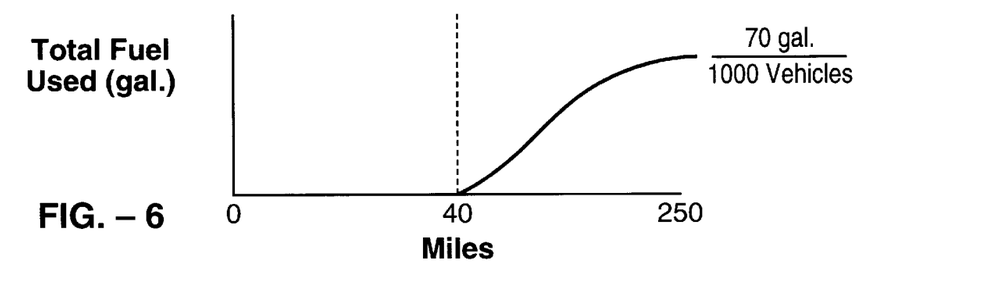
FIG. 6 is a graph depicting the total fuel used by a 1000 vehicle fleet travelling according to the distribution density shown in FIG. 5.
Figure 7:
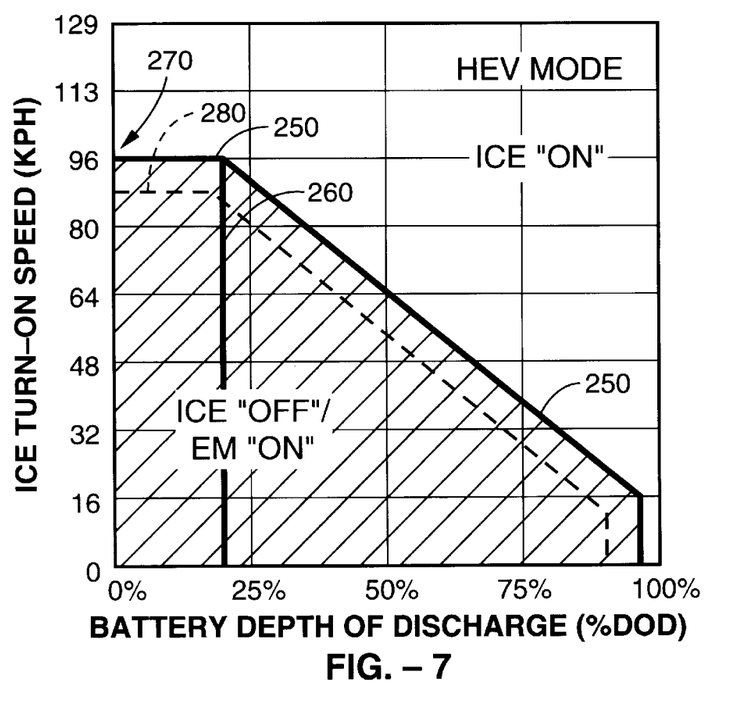
FIG. 7 is a graph depicting an alternative to the control policy shown in FIG. 4.
Figure 8:
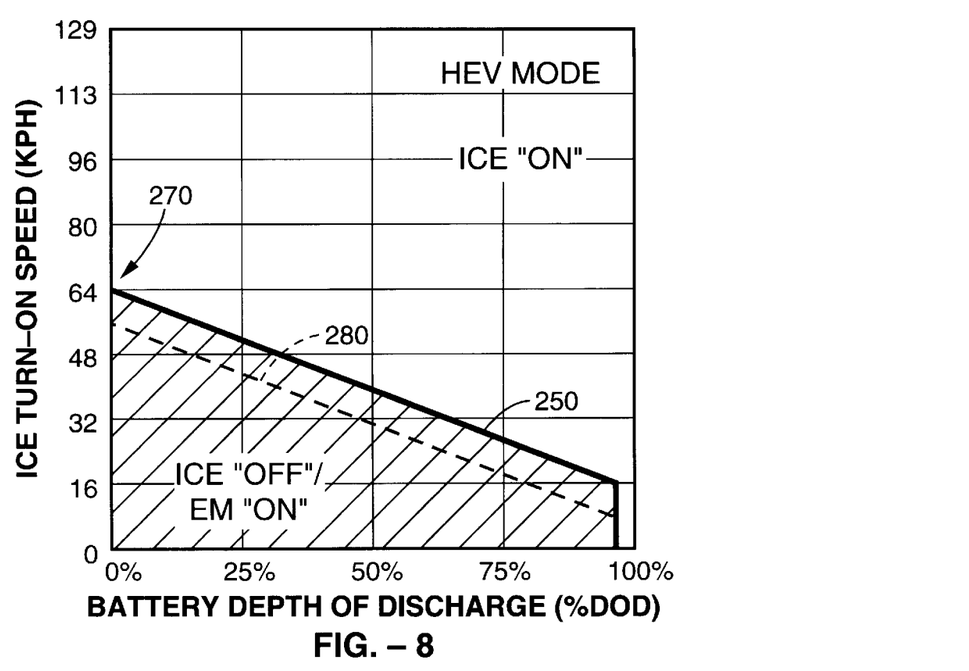
FIG. 8 is a graph depicting a second alternative to the control policy shown in FIG. 4.
Figure 9:
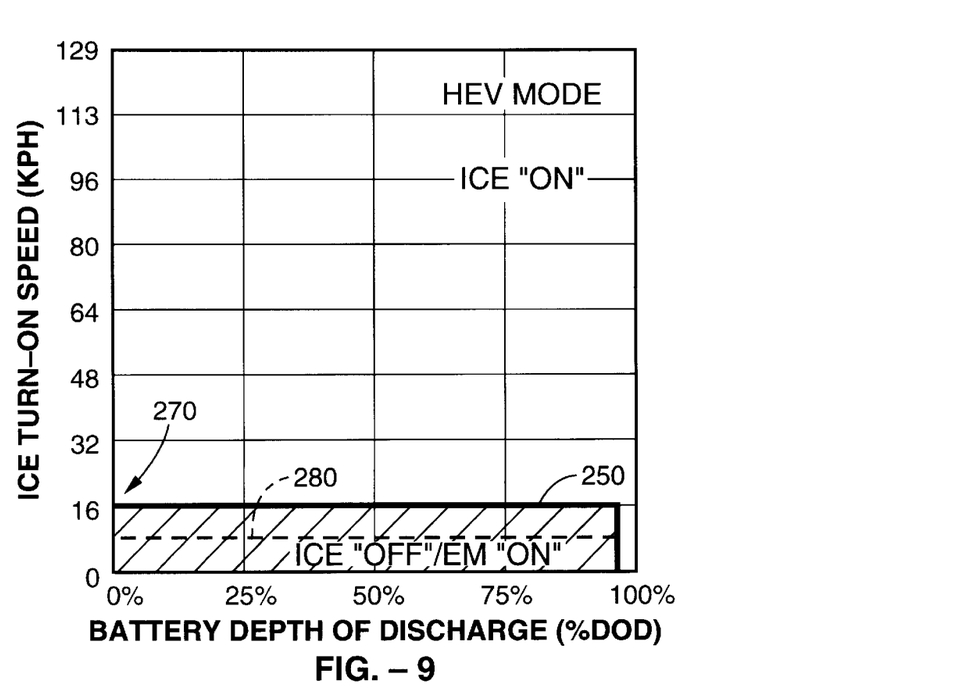
FIG. 9 is a graph depicting a third alternative to the control policy shown in FIG. 4 showing a strategy which minimizes use of electric energy to extend the range of the vehicle in city and highway driving to a maximum.

It will be appreciated that the control policy shown in FIG. 4 can be adjusted for the kind of driving done by most people and/or the objectives of the regulating agencies. For example, referring to FIG. 5 and FIG. 6, assume that typical commuters travel 40 miles and that a conventional fleet of 1000 vehicles driven by such commuters uses 2500 gallons of gasoline. The control curve shown in FIG. 4 in a charge depletion hybrid electric vehicle as described would reduce fleet consumption of gasoline to approximately 70 gallons per 1000 vehicles for an approximate gasoline savings of 97%. By lowering the hybrid integration cross-over point 260 from 50% to 20% as shown in FIG. 7 however, only a 95% gasoline savings would be realized. If the hybrid integration crossover point is further reduced to zero percent and the maximum speed threshold is lowered from 113 kph to approximately 64 kph as shown in FIG. 8, only an 85% gasoline savings would be realized. For a zero percent hybrid integration cross-over point, by further lowering the maximum speed threshold to 16 kph as shown in FIG. 9, only a 60% gasoline savings would be realized.

As a result, the invention can provide for the advantages of a zero emissions vehicle in city driving conditions if CPCD policies shown in FIG. 4 and FIG. 7 are used, as well as extended range and high efficiencies from an internal combustion engine at freeway/highway speeds. If such a hybrid is to be used only for fuel economy, then the control policy of FIG. 9 may be used. FIG. 8 represents an interim policy possible for use in some cities in the U.S.

Figure 10:
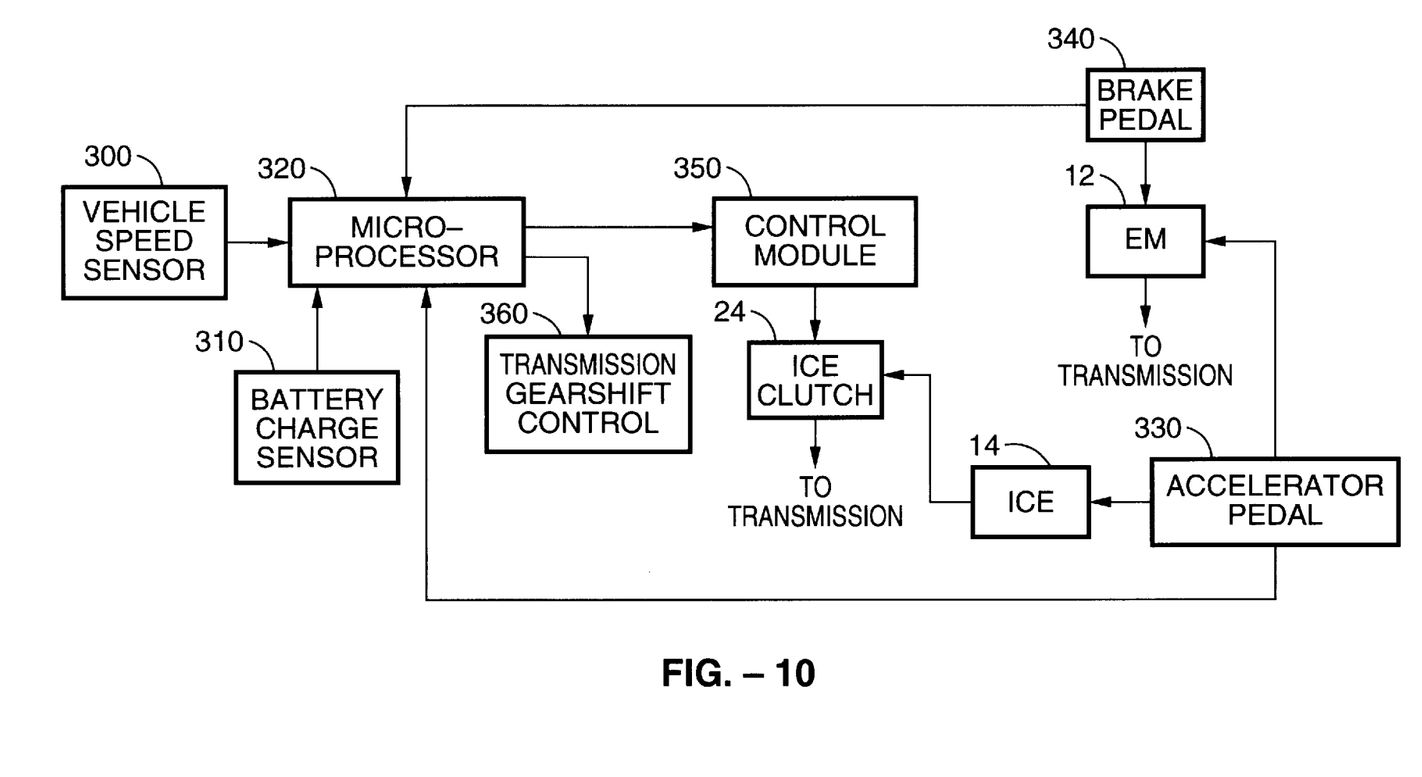
FIG. 10 is a block diagram of a charge depletion control system in accordance with the present invention for controlling the ICE, EM, clutch and transmission from an accelerator pedal and a brake pedal.

Referring to FIG. 10, a preferred embodiment of a control system for implementing the control method of the present invention uses a microprocessor or the like which is programmed with the control parameters shown in FIG. 3, FIG. 4 and FIG. 7 through FIG. 9. The control parameters shown in FIG. 4 and FIG. 7 through FIG. 9 could be programmed as a formula for fully dynamic monitoring and control or, alternatively, data points along the curve could be placed into a lookup table. Preferably, the control parameters would be stored in a read only memory (ROM) that would be replaced to implement a new control policy. Alternatively, the control parameters could be stored in programmable read only memory (PROM) or in random access memory (RAM) to allow regulators or users to control the fuel ratio when desired.

Further, if a lookup table is used, a fuzzy logic implementation is contemplated to be within the scope of the invention. With any of the implementations, however, conventional sensors would be employed to monitor speed of the vehicle and depth of discharge of the battery to provide inputs to the microprocessor for control of the internal combustion engine. The depth of discharge of the battery may require periodic calibration depending on the battery technology employed.

The embodiment shown in FIG. 10 includes a vehicle speed sensor 300 and a battery depth of discharge (or charge) sensor 310 which feeds a microprocessor 320. Microprocessor 320 also receives signals from an accelerator pedal 330 which provides information as described with reference to FIG. 11 below, and signals from a brake pedal 340 which provides information as described with reference to FIG. 12 below. Based on these inputs, microprocessor 320 then outputs control signals to a control module 350 which couples or uncouples clutch 24 and allows ICE 14 to operate based on the state of the batteries and vehicle speed. Microprocessor 320 also outputs control signals to a transmission control 360 which may select the gear ratio, or select the ratio rate if a continuously variable transmission is used.

Figure 11:
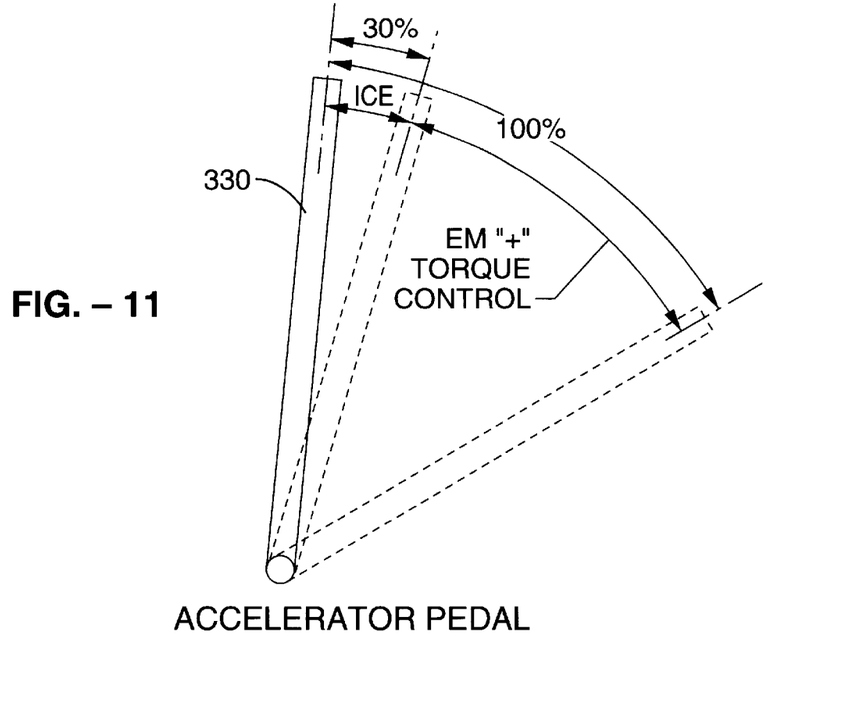
FIG. 11 is a diagram showing operation of a typical two-stage accelerator pedal in accordance with the present invention.

Referring also to FIG. 11, control of the EM 12 and the ICE 14 is further accomplished using a two stage, or dual-mode, accelerator pedal. Approximately the first 30% of pedal travel controls the throttle position of the ICE 14 and approximately the last 70% serves as a "+" torque control for the EM 12 to provide supplemental torque and power to the ICE 14. When operating in the HEV mode (e.g., cruising speeds above 113 kph, or at lower speeds if battery depth of discharge exceeds the crossover threshold), the ICE 14 operates at wide open throttle most of the time and, when additional power is required (e.g., for accelerating, passing, climbing), the driver depresses the pedal further and the electric motor torque is automatically increased. The pedal is mechanically linked to the ICE 14 and provides acceleration response proportional to the pedal position as in a conventional car. When the ICE is "off line" then the accelerator pedal may have a deadspace which the driver cannot discern or the accelerator pedal can be recalibrated to eliminate the dead space automatically.

Figure 12:
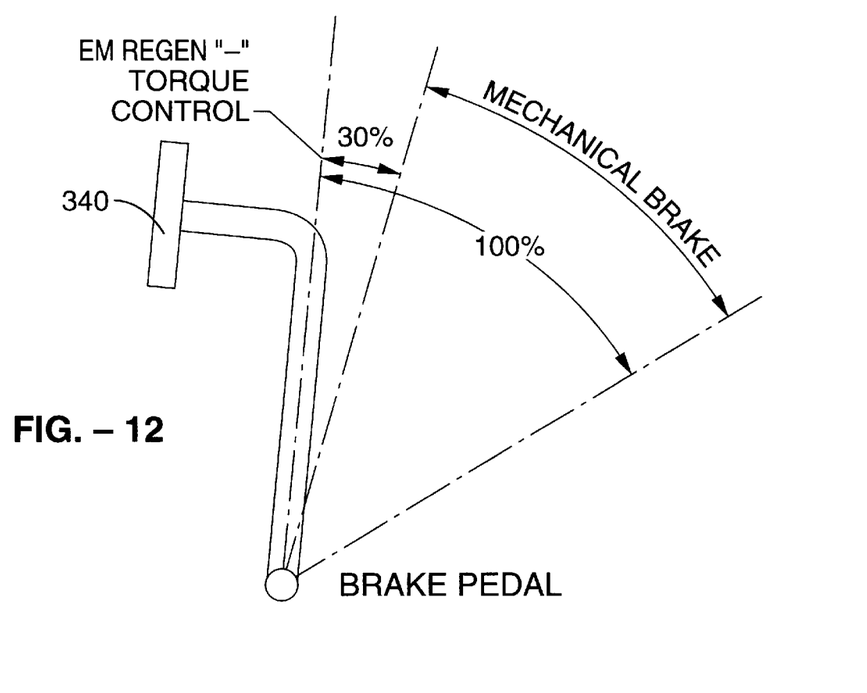
FIG. 12 is a diagram showing operation of a typical two-stage brake pedal in accordance with the present invention.

As shown in FIG. 12, brake pedal 340 is also configured as a two stage, or dual-mode, pedal. Approximately the first 30% of pedal travel controls the regenerative braking of the EM 12, thus serving as a brake torque control, and approximately the last 70% operates mechanical brakes. In normal operation very little mechanical braking is used except when holding the vehicle stopped on a hill.

Accordingly, it will be seen that this invention coordinates the operation of the electric motor and an auxiliary power unit such as an internal combustion engine in a hybrid vehicle for efficient operation and dependent on the amount of gasoline versus electric energy to be used. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus for controlling operation of a hybrid powered vehicle having an electric motor, a battery powering said electric motor, and an auxiliary power unit, comprising:

(a) means for sensing the speed of the vehicle;

(b) means sensing the depth of discharge of the battery;

(c) means, at vehicle speeds above a threshold speed, for activating said auxiliary power unit to power said vehicle and for using said electric motor to supplement said auxiliary power unit when required;

(e) means, at vehicle speeds below said threshold speed, for deactivating said auxiliary power unit and using said electric motor to power said vehicle;

(f) means for dynamically adjusting said threshold speed as a function of said depth of discharge, wherein said threshold speed and adjustment of said threshold speed are a function of a control policy for said auxiliary power unit based on desired fuel consumption and/or vehicle emissions characteristics.

2. A control apparatus for a hybrid powered vehicle having an electric motor, a battery powering the electric motor, and an auxiliary power unit, comprising:

(a) means for sensing the speed of the vehicle;

(b) means for sensing the depth of discharge of the battery;

(c) means for, at vehicle speeds above a first threshold speed, activating the auxiliary power unit to power the vehicle and using the electric motor to supplement the auxiliary power unit when required;

(d) means for, at vehicle speeds below a second threshold speed, deactivating the auxiliary power unit and using the electric motor to power the vehicle;

(f) means for dynamically adjusting said first and second threshold speeds as a function of said depth of discharge, wherein said threshold speeds and adjustment of said threshold speeds are a function of a control policy for said auxiliary power unit based on desired fuel consumption and/or vehicle emissions characteristics.

3. A method of controlling the operation of a hybrid electric vehicle having an electric motor, a battery powering the electric motor, and an auxiliary power unit, comprising the steps of:

(a) sensing the speed of the vehicle;

(b) sensing the depth of discharge of the battery;

(c) at vehicle speeds above a threshold speed, activating the auxiliary power unit to power the vehicle and using the electric motor to supplement the auxiliary power unit when required;

(d) at vehicle speeds below the threshold speed, deactivating the auxiliary power unit and using the electric motor to power the vehicle; and (e) dynamically adjusting the threshold speed as a function of said depth of discharge, wherein said threshold speed and adjustment of said threshold speed are a function of a control policy for said auxiliary power unit based on desired fuel consumption and/or vehicle emissions characteristics.

4. A method of operating a hybrid electric vehicle having an electric motor, a battery powering the electric motor, and an auxiliary power unit, comprising the steps of:

(a) sensing the speed of the vehicle;

(b) sensing the depth of discharge of the battery;

(c) at vehicle speeds above a first threshold speed, activating the auxiliary power unit to power the vehicle and using the electric motor to supplement the auxiliary power unit when required;

(d) at vehicle speeds below a second threshold speed, deactivating the auxiliary power unit and using the electric motor to power the vehicle; and (e) dynamically adjusting said first and second threshold speeds as a function of said depth of discharge, wherein said threshold speeds and adjustment of said threshold speeds are a function of a control policy for said auxiliary power unit based on desired fuel consumption and/or vehicle emissions characteristics.

5. A method of controlling the operation of a hybrid electric vehicle having an electric motor, a battery powering the electric motor, and an auxiliary power unit, comprising the steps of:

(a) sensing the speed of the vehicle;

(b) sensing the depth of discharge of the battery;

(c) at vehicle speeds above a threshold speed, activating the auxiliary power unit to power the vehicle and using the electric motor to supplement the auxiliary power unit when required; and (d) at vehicle speeds below the threshold speed, deactivating the auxiliary power unit and using the electric motor to power the vehicle, wherein said battery is charge depleted during operation of said vehicle, wherein charge depletion of said battery is a function of a control policy for said auxiliary power unit based on desired fuel consumption and/or vehicle emissions characteristics.

6. A method of controlling the operation of a hybrid electric vehicle having an electric motor, a battery powering the electric motor, and an auxiliary power unit, comprising the steps of:

(a) sensing the speed of the vehicle;

(b) sensing the depth of discharge of the battery;

(c) at vehicle speeds above a threshold speed, activating the auxiliary power unit to power the vehicle and using the electric motor to supplement the auxiliary power unit when required;

(d) at vehicle speeds below the threshold speed, deactivating the auxiliary power unit and using the electric motor to power the vehicle; and (e) dynamically reducing the threshold speed as the depth of discharge increases, wherein the charge on said battery is depleted by operation of said electric motor and wherein said battery is not recharged by said auxiliary power unit during operation of said vehicle, wherein said threshold speed and adjustment of said threshold speed are a function of a control policy for said auxiliary power unit based on desired fuel consumption and/or vehicle emissions characteristics.

* * * * *

UNITED STATES PATENT AND TRADEMARK OFFICE
CERTIFICATE OF CORRECTION

PATENT NO.   : 6,116,363
DATED        : September 12, 2000
INVENTOR(S)  : Andrew A. Frank It is certified that error appears in the above-identified patent and that said Letters Patent is hereby corrected as shown below:

<u>Title page,</u>
Item [56], References Cited, U.S. PATENT DOCUMENTS and OTHER PUBLICATIONS:
Change "5,923,025, 07/1999, Ellers" to -- 4,923,025, 07/1990, Ellers --
Add -- 5,125,469, 06/1992, Scott --
  -- 5,172,006, 12/1992, Suzuki et al. --
  -- Volkswagen AG, "Golf with Diesel/Electric Hybridrive," Undated document --
  -- Renault Launched NEXT, an Interesting Hybrid Car," Road & Track, pp. 47-49, August, 1996. --

Signed and Sealed this

Nineteenth Day of March, 2002

Attest:

JAMES E. ROGAN
*Attesting Officer*     *Director of the United States Patent and Trademark Office*